(12) United States Patent
Jiang et al.

(10) Patent No.: US 11,885,876 B2
(45) Date of Patent: Jan. 30, 2024

(54) UNDERWATER ULTRASONIC DEVICE

(71) Applicant: QISDA CORPORATION, Taoyuan (TW)

(72) Inventors: Fu-Sheng Jiang, Taoyuan (TW); Chun-Chieh Wang, New Taipei (TW); Yi-Hsiang Chan, Taoyuan (TW); Heng-Yi Shiu, Taoyuan (TW); Hsin-Chih Liu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 663 days.

(21) Appl. No.: 17/017,724

(22) Filed: Sep. 11, 2020

(65) Prior Publication Data
US 2021/0096242 A1  Apr. 1, 2021

(30) Foreign Application Priority Data

Sep. 30, 2019 (CN) .......................... 201910939910.9
May 29, 2020 (TW) ................................. 109117961

(51) Int. Cl.
*G01S 15/66* (2006.01)
*G01S 7/521* (2006.01)
*G01S 15/50* (2006.01)

(52) U.S. Cl.
CPC .............. *G01S 15/66* (2013.01); *G01S 7/521* (2013.01); *G01S 15/50* (2013.01)

(58) Field of Classification Search
CPC ........... G01S 15/66; G01S 7/521; G01S 15/50
See application file for complete search history.

(56) References Cited

U.S. PATENT DOCUMENTS

| | | | |
|---|---|---|---|
| 8,811,120 B2* | 8/2014 | Bachelor .............. | G10K 11/343 367/103 |
| 2010/0067330 A1* | 3/2010 | Collier .................... | G01S 15/42 367/88 |
| 2020/0072953 A1* | 3/2020 | Wigh ...................... | G01S 15/89 |

FOREIGN PATENT DOCUMENTS

| | | |
|---|---|---|
| CN | 203133279 U | 8/2013 |
| TW | M406734 U1 | 7/2011 |
| WO | 2016/071961 A1 | 5/2016 |

\* cited by examiner

*Primary Examiner* — Isam A Alsomiri
*Assistant Examiner* — Joseph C Fritchman

(57) ABSTRACT

An underwater ultrasonic device includes a curvilinear ultrasonic transducer and a plurality of straight linear ultrasonic transducers. The straight linear ultrasonic transducers are disposed with respect to the curvilinear ultrasonic transducer. A first angle is included between the straight linear ultrasonic transducers. One of the curvilinear ultrasonic transducer and the straight linear ultrasonic transducer is configured to transmit a plurality of ultrasonic signals. Another one of the curvilinear ultrasonic transducer and the straight linear ultrasonic transducer is configured to receive a plurality of reflected signals of the ultrasonic signals.

6 Claims, 15 Drawing Sheets

UNDERWATER ULTRASONIC DEVICE

BACKGROUND OF THE INVENTION

1. Field of the Invention

The invention relates to an underwater ultrasonic device and, more particularly, to an underwater ultrasonic device capable of expanding a measuring range effectively.

2. Description of the Prior Art

Since ultrasound does not destroy material structure and harm living thing, an underwater ultrasonic device is in widespread use for the field of underwater measurement. The conventional underwater ultrasonic device for a wide-angle measuring range essentially consists of a plurality of ultrasonic transducers and each of which transmits and receives ultrasound individually. In other words, the conventional underwater ultrasonic device forms a wide-angle measuring range by a plurality of measuring ranges of the ultrasonic transducers. However, when the ultrasonic transducers are spliced together, a lot of blind spots may be formed between the ultrasonic transducers, such that the accuracy of measurement may be influenced.

SUMMARY OF THE INVENTION

An objective of the invention is to provide an underwater ultrasonic device capable of expanding a measuring range effectively.

According to an embodiment of the invention, an underwater ultrasonic device comprises a curvilinear ultrasonic transducer and a plurality of straight linear ultrasonic transducers. The straight linear ultrasonic transducers are disposed with respect to the curvilinear ultrasonic transducer. A first angle is included between the straight linear ultrasonic transducers. One of the curvilinear ultrasonic transducer and the straight linear ultrasonic transducer is configured to transmit a plurality of ultrasonic signals. Another one of the curvilinear ultrasonic transducer and the straight linear ultrasonic transducer is configured to receive a plurality of reflected signals of the ultrasonic signals.

According to another embodiment of the invention, an underwater ultrasonic device comprises a curvilinear ultrasonic transducer, a first straight linear ultrasonic transducer, a second straight linear ultrasonic transducer, a third straight linear ultrasonic transducer and a fourth straight linear ultrasonic transducer. The second straight linear ultrasonic transducer and the first straight linear ultrasonic transducer are arranged end to end at a first side of the curvilinear ultrasonic transducer. A first angle is included between the first straight linear ultrasonic transducer and the second straight linear ultrasonic transducer, such that the first straight linear ultrasonic transducer and the second straight linear ultrasonic transducer share an axial center. The fourth straight linear ultrasonic transducer and the third straight linear ultrasonic transducer are arranged end to end at a second side of the curvilinear ultrasonic transducer, wherein the second side is opposite to the first side. A second angle is included between the third straight linear ultrasonic transducer and the fourth straight linear ultrasonic transducer, such that the third straight linear ultrasonic transducer and the fourth straight linear ultrasonic transducer share another axial center.

According to another embodiment of the invention, an underwater ultrasonic device comprises a curvilinear ultrasonic transmitter, a first straight linear ultrasonic receiver, a second straight linear ultrasonic receiver, a third straight linear ultrasonic receiver and a fourth straight linear ultrasonic receiver. The curvilinear ultrasonic transmitter is configured to transmit signals towards a fan-shaped region. The first straight linear ultrasonic receiver is configured to receive reflected signals of a first region. The second straight linear ultrasonic receiver and the first straight linear ultrasonic receiver are arranged end to end at a first side of the curvilinear ultrasonic transmitter. A first angle is included between the first straight linear ultrasonic receiver and the second straight linear ultrasonic receiver. The second straight linear ultrasonic receiver is configured to receive reflected signals of a second region. The third straight linear ultrasonic receiver is configured to receive reflected signals of a third region. The fourth straight linear ultrasonic receiver and the third straight linear ultrasonic receiver are arranged end to end at a second side of the curvilinear ultrasonic transmitter, wherein the second side is opposite to the first side. A second angle is included between the third straight linear ultrasonic receiver and the fourth straight linear ultrasonic receiver. The fourth straight linear ultrasonic receiver is configured to receive reflected signals of a fourth region, wherein the first, second, third and fourth regions are continuous regions including the fan-shaped region.

As mentioned in the above, the invention may forma wide-angle measuring range by overlapping a measuring range (e.g. transmitting range or receiving range) of a curvilinear ultrasonic transducer and a measuring range (e.g. transmitting range or receiving range) of the straight linear ultrasonic transducers. Furthermore, if a target is moving, the invention may change a displacement between the ultrasonic transducers to change the measuring range along with the movement of the target, so as to track the target.

In an embodiment, two straight linear ultrasonic transducers located at an identical side of the curvilinear ultrasonic transducer are arranged end to end and have an angle included therebetween, such that the two straight linear ultrasonic transducers share an axial center. Accordingly, the invention can reduce the whole thickness of the underwater ultrasonic device effectively. Still further, the straight linear ultrasonic transducer may be apart from the curvilinear ultrasonic transducer by a predetermined distance, so as to prevent the measuring range of the straight linear ultrasonic transducer from interfering with the curvilinear ultrasonic transducer. Moreover, the invention may adjust the length of the straight linear ultrasonic transducer according to different applications, so as to improve the resolution of the corresponding portion in the image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
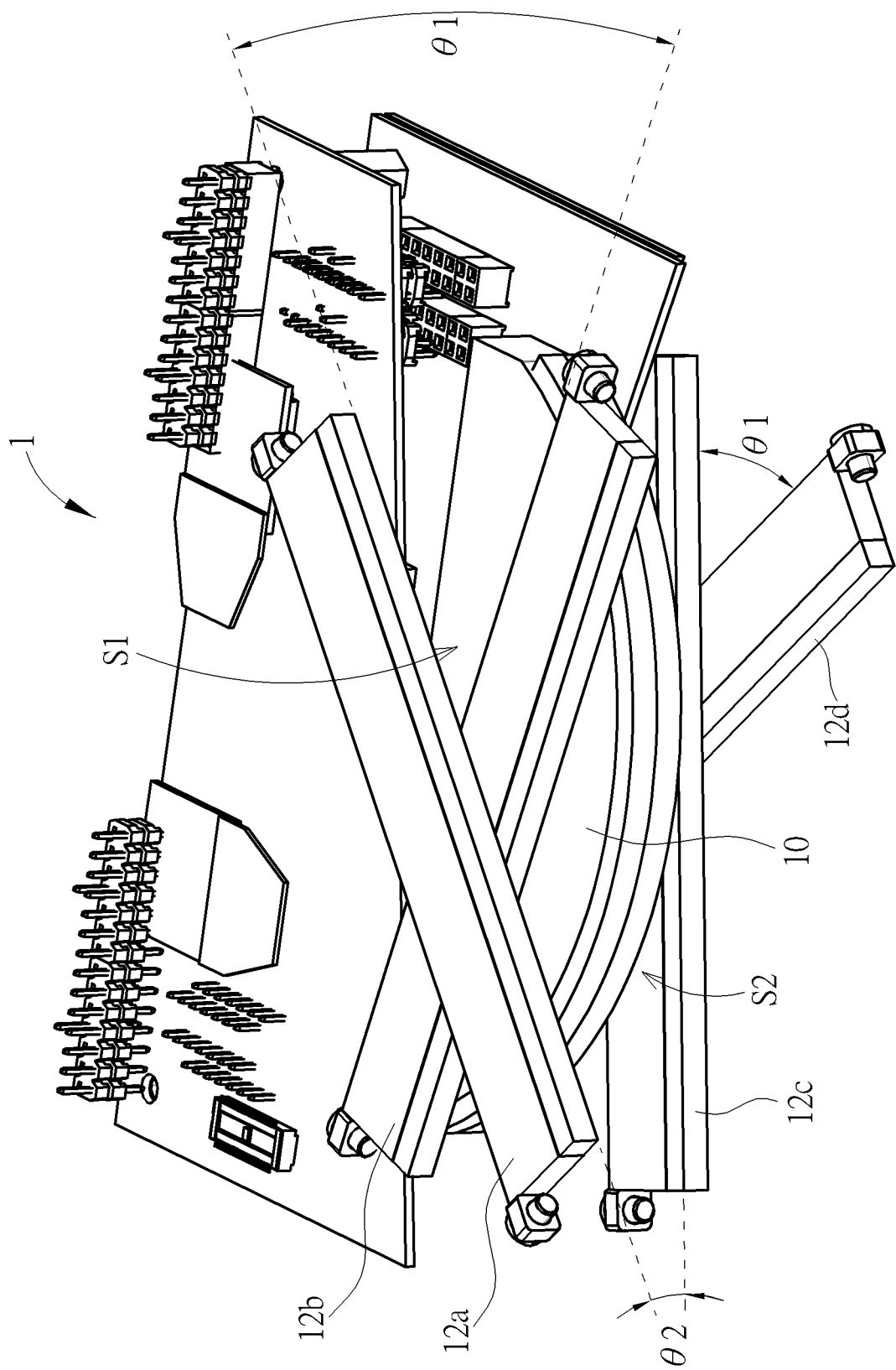
FIG. 1 is a perspective view illustrating an underwater ultrasonic device according to an embodiment of the invention.
Figure 2:
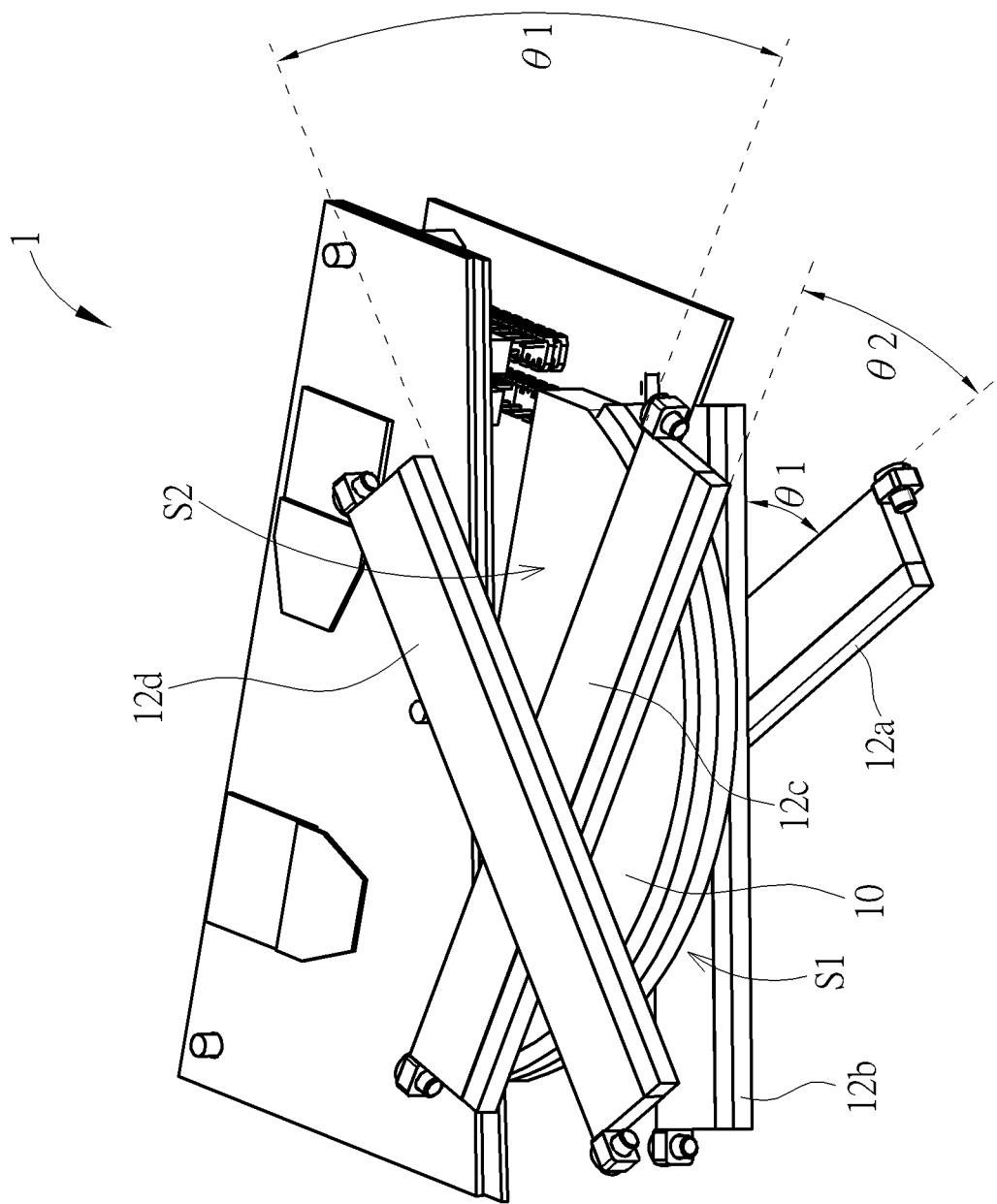
FIG. 2 is a perspective view illustrating the underwater ultrasonic device shown in FIG. 1 from another viewing angle.
Figure 3:
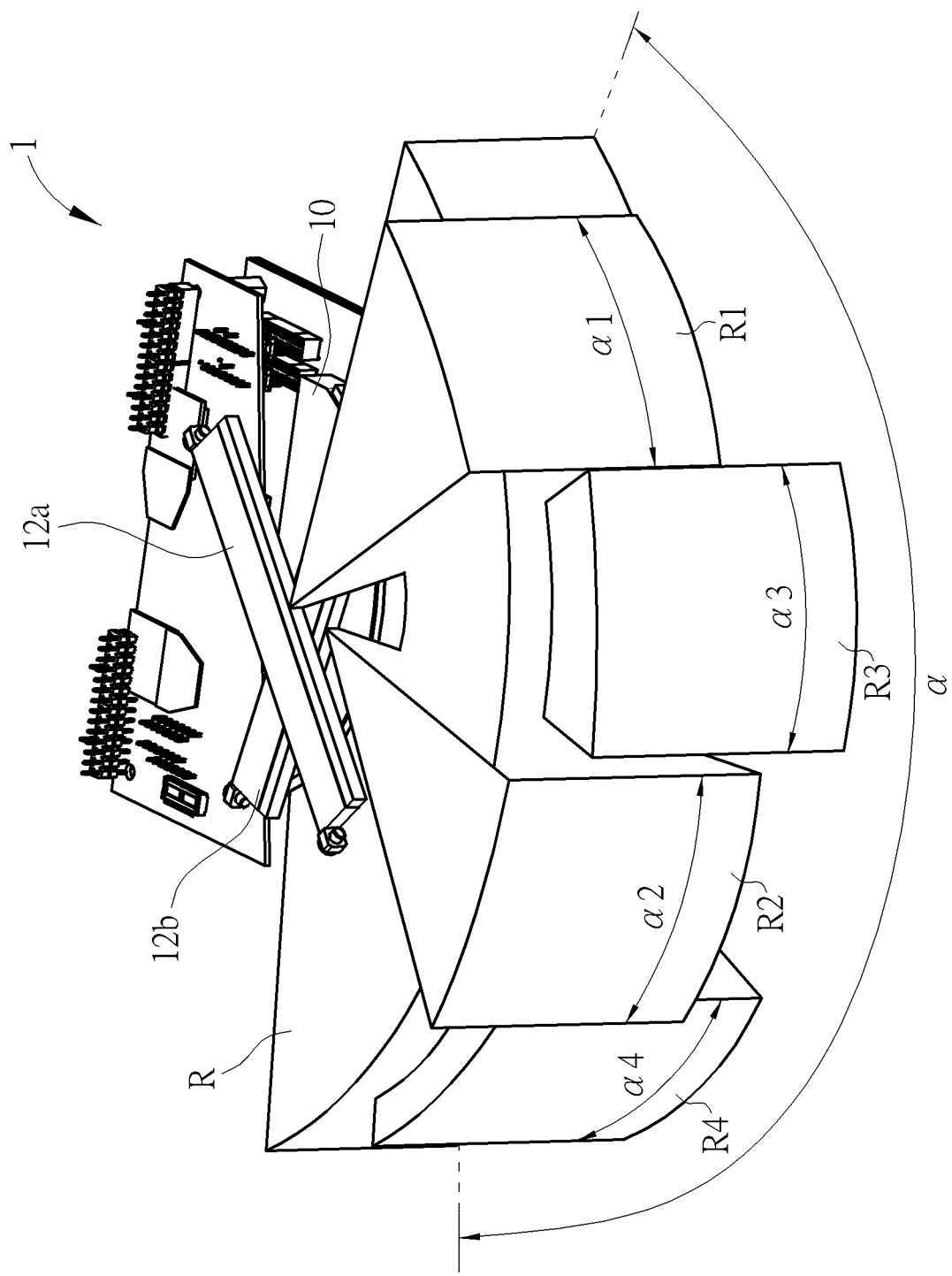
FIG. 3 is a schematic view illustrating the underwater ultrasonic device shown in FIG. 1 forming a wide-angle measuring range.
Figure 4:
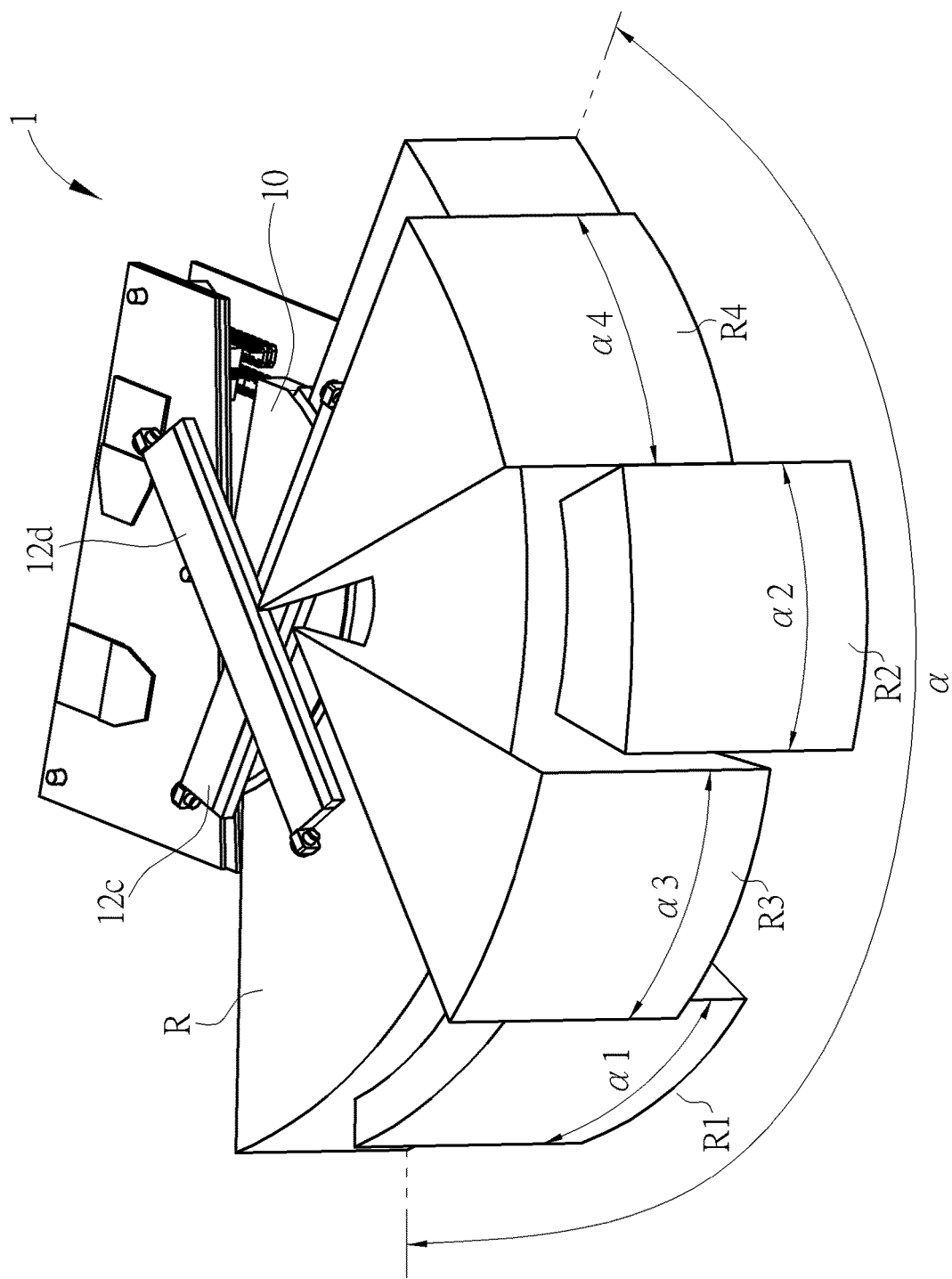
FIG. 4 is a schematic view illustrating the underwater ultrasonic device shown in FIG. 2 forming a wide-angle measuring range.

Referring to FIGS. 1 to 4, FIG. 1 is a perspective view illustrating an underwater ultrasonic device 1 according to an embodiment of the invention, FIG. 2 is a perspective view illustrating the underwater ultrasonic device 1 shown in FIG. 1 from another viewing angle, FIG. 3 is a schematic view illustrating the underwater ultrasonic device 1 shown in FIG. 1 forming a wide-angle measuring range, and FIG. 4 is a schematic view illustrating the underwater ultrasonic device 1 shown in FIG. 2 forming a wide-angle measuring range.

As shown in FIGS. 1 and 2, the underwater ultrasonic device 1 comprises a curvilinear ultrasonic transducer 10 and a plurality of straight linear ultrasonic transducers 12a, 12b, 12c, 12d, wherein the straight linear ultrasonic transducers 12a, 12b, 12c, 12d are disposed with respect to the curvilinear ultrasonic transducer 10 and a first angle θ1 is included between the straight linear ultrasonic transducers 12a, 12b, 12c, 12d. It should be noted that a phased array ultrasonic transducer is also a straight linear ultrasonic transducer mentioned in the invention. Furthermore, the curvilinear ultrasonic transducer 10 may be replaced by an ultrasonic transducer with other shapes according to practical applications.

In this embodiment, the straight linear ultrasonic transducers 12a, 12b, 12c, 12d may comprise a first straight linear ultrasonic transducer 12a, a second straight linear ultrasonic transducer 12b, a third straight linear ultrasonic transducer 12c and a fourth straight linear ultrasonic transducer 12d. The second straight linear ultrasonic transducer 12b may be stacked with the first straight linear ultrasonic transducer 12a at a first side S1 of the curvilinear ultrasonic transducer 10, and the fourth straight linear ultrasonic transducer 12d may be stacked with the third straight linear ultrasonic transducer 12c at a second side S2 of the curvilinear ultrasonic transducer 10, wherein the second side S2 is opposite to the first side S1. In other words, the straight linear ultrasonic transducers 12a, 12b, 12c, 12d may be paired and disposed at opposite sides of the curvilinear ultrasonic transducer 10.

As shown in FIG. 1, the first angle θ1 is included between the first straight linear ultrasonic transducer 12a and the second straight linear ultrasonic transducer 12b, such that the second straight linear ultrasonic transducer 12b is stacked with the first straight linear ultrasonic transducer 12a to form an X-shape. As shown in FIG. 2, the first angle θ1 is also included between the third straight linear ultrasonic transducer 12c and the fourth straight linear ultrasonic transducer 12d, such that the fourth straight linear ultrasonic transducer 12d is also stacked with the third straight linear ultrasonic transducer 12c to form an X-shape.

In this embodiment, one of the curvilinear ultrasonic transducer and the straight linear ultrasonic transducer may be configured to transmit a plurality of ultrasonic signals, and another one of the curvilinear ultrasonic transducer and the straight linear ultrasonic transducer may be configured to receive a plurality of reflected signals of the ultrasonic signals. For example, in an embodiment, the curvilinear ultrasonic transducer 10 may be configured to transmit a plurality of ultrasonic signals and each of the straight linear ultrasonic transducers 12a, 12b, 12c, 12d may be configured to receive parts of a plurality of reflected signals of the ultrasonic signals. Accordingly, the invention may form a wide-angle measuring range by overlapping a transmitting range of the curvilinear ultrasonic transducer 10 and a receiving range of each of the straight linear ultrasonic transducers 12a, 12b, 12c, 12d. In this embodiment, a length of each of the straight linear ultrasonic transducers 12a, 12b, 12c, 12d may be essentially equal to a radius of the curvilinear ultrasonic transducer 10, such that the resolution of the receiving region corresponding to each straight linear ultrasonic transducer may increase, so as to obtain a clearer image. In another embodiment, each of the straight linear ultrasonic transducers 12a, 12b, 12c, 12d may be configured to transmit a plurality of ultrasonic signals and the curvilinear ultrasonic transducer 10 may be configured to receive a plurality of reflected signals of the ultrasonic signals. Accordingly, the invention may form a wide-angle measuring range by overlapping a receiving range of the curvilinear ultrasonic transducer 10 and a transmitting range of each of the straight linear ultrasonic transducers 12a, 12b, 12c, 12d.

As shown in FIGS. 3 and 4, a measuring range R of the curvilinear ultrasonic transducer 10 has an ultrasonic coverage angle α, a measuring range R1 of the first straight linear ultrasonic transducer 12a has an ultrasonic coverage angle α1, a measuring range R2 of the second straight linear ultrasonic transducer 12b has an ultrasonic coverage angle α2, a measuring range R3 of the third straight linear ultrasonic transducer 12c has an ultrasonic coverage angle α3, and a measuring range R4 of the fourth straight linear ultrasonic transducer 12d has an ultrasonic coverage angle α4. It should be noted that when the measuring range R is a transmitting range, each of the measuring ranges R1, R2, R3, R4 is a receiving range. On the other hand, when the measuring range R is a receiving range, each of the measuring ranges R1, R2, R3, R4 is a transmitting range. For example, the ultrasonic coverage angle α of the curvilinear ultrasonic transducer 10 may be 120 degrees and each of the ultrasonic coverage angles α1, α2, α3, α4 of the straight linear ultrasonic transducers 12a, 12b, 12c, 12d may be 30 degrees. At this time, the invention may form a wide-angle measuring range of 120 degrees by overlapping the measuring range R of the curvilinear ultrasonic transducer 10 and the measuring ranges R1, R2, R3, R4 of the straight linear ultrasonic transducers 12a, 12b, 12c, 12d.

In this embodiment, a multiple relationship exists between the aforesaid first angle θ1 and the ultrasonic coverage angles α1, α2, α3, α4. Furthermore, a second angle θ2 is included between the first straight linear ultrasonic transducer 12a and the third straight linear ultrasonic transducer 12c, wherein a multiple relationship also exists between the first angle θ1 and the second angle θ2. For example, each of the ultrasonic coverage angles α1, α2, α3, α4 may be 30 degrees, the first angle θ1 may be 60 degrees, and the second angle θ2 may be 30 degrees, such that the measuring ranges R1, R2, R3, R4 of the straight linear ultrasonic transducers 12a, 12b, 12c, 12d may be arranged in an interlaced manner, as shown in FIGS. 3 and 4, so as to cooperate with the measuring range R of the curvilinear ultrasonic transducer 10 to form a wide-angle measuring range of 120 degrees.

In another embodiment, the underwater ultrasonic device 1 of the invention may further comprise a shifting mechanism (not shown) coupled to the curvilinear ultrasonic transducer 10 and/or the straight linear ultrasonic transducers 12a, 12b, 12c, 12d and configured to change a displacement between the curvilinear ultrasonic transducer 10 and the straight linear ultrasonic transducers 12a, 12b, 12c, 12d. The overlapping range between the measuring range R of the curvilinear ultrasonic transducer 10 and the measuring ranges R1, R2, R3, R4 of the straight linear ultrasonic transducers 12a, 12b, 12c, 12d will change while the displacement changes. Accordingly, if a target is moving, the invention may change a displacement between the curvilinear ultrasonic transducer 10 and the straight linear ultrasonic transducers 12a, 12b, 12c, 12d to change the measuring range along with the movement of the target, so as to track the target. It should be noted that the aforesaid shifting mechanism may be a moving mechanism, a rotating mechanism, or a combination thereof according to practical applications.

In another embodiment of the invention, the straight linear ultrasonic transducers may be stacked with each other at an identical side of the curvilinear ultrasonic transducer 10. For example, the straight linear ultrasonic transducers 12a, 12b may be stacked with each other at the first side S1 of the curvilinear ultrasonic transducer 10 and the straight linear ultrasonic transducers 12c, 12d may be removed from the second side S2 of the curvilinear ultrasonic transducer 10, so as to adjust the measuring range for different requirements.

In another embodiment of the invention, the straight linear ultrasonic transducers 12a, 12c may be disposed at opposite sides of the curvilinear ultrasonic transducer 10 and the straight linear ultrasonic transducers 12b, 12d may be removed, so as to adjust the measuring range for different requirements.

Figure 5:
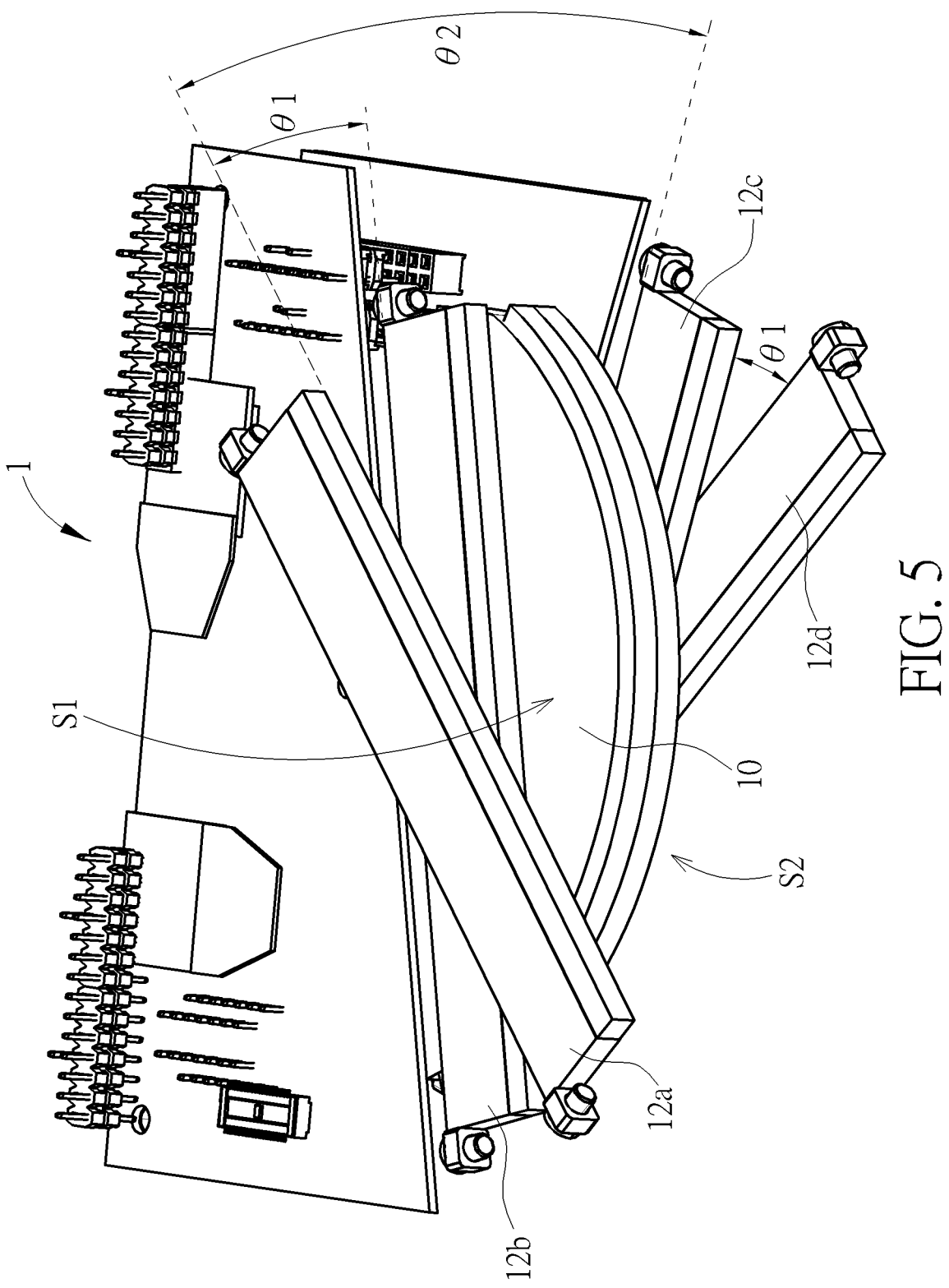
FIG. 5 is a perspective view illustrating an underwater ultrasonic device according to another embodiment of the invention.
Figure 6:
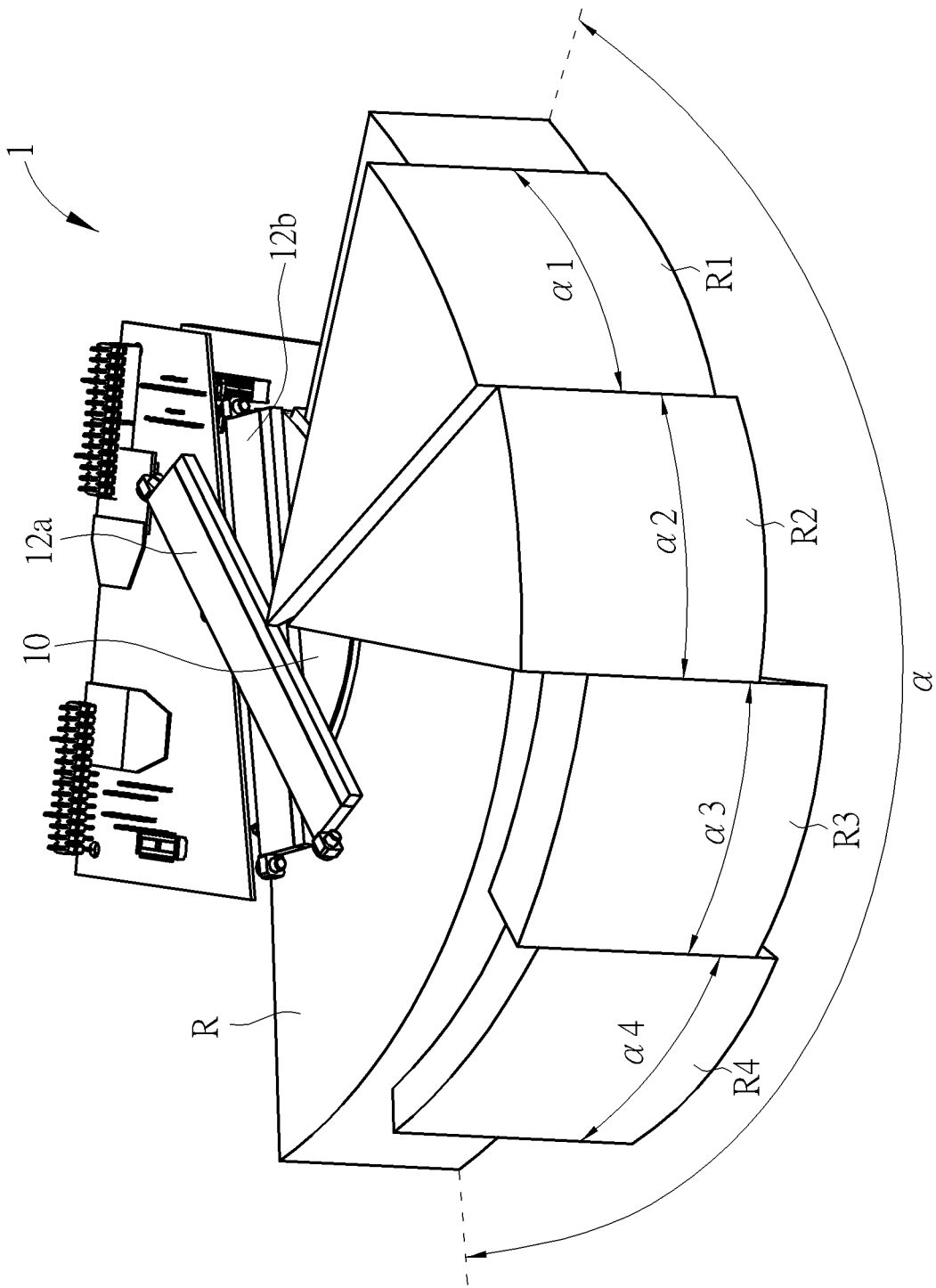
FIG. 6 is a schematic view illustrating the underwater ultrasonic device shown in FIG. 5 forming a wide-angle measuring range.

Referring to FIGS. 5 and 6, FIG. 5 is a perspective view illustrating an underwater ultrasonic device 1 according to another embodiment of the invention and FIG. 6 is a schematic view illustrating the underwater ultrasonic device 1 shown in FIG. 5 forming a wide-angle measuring range. In this embodiment, each of the ultrasonic coverage angles α1, α2, α3, α4 may be 30 degrees, the first angle θ1 may be 30 degrees, and the second angle θ2 may be 60 degrees, as shown in FIG. 5. Accordingly, the measuring ranges R1, R2, R3, R4 of the straight linear ultrasonic transducers 12a, 12b, 12c, 12d may be arranged in sequence, as shown in FIG. 6, so as to cooperate with the measuring range R of the curvilinear ultrasonic transducer 10 to form a wide-angle measuring range of 120 degrees.

Figure 7:
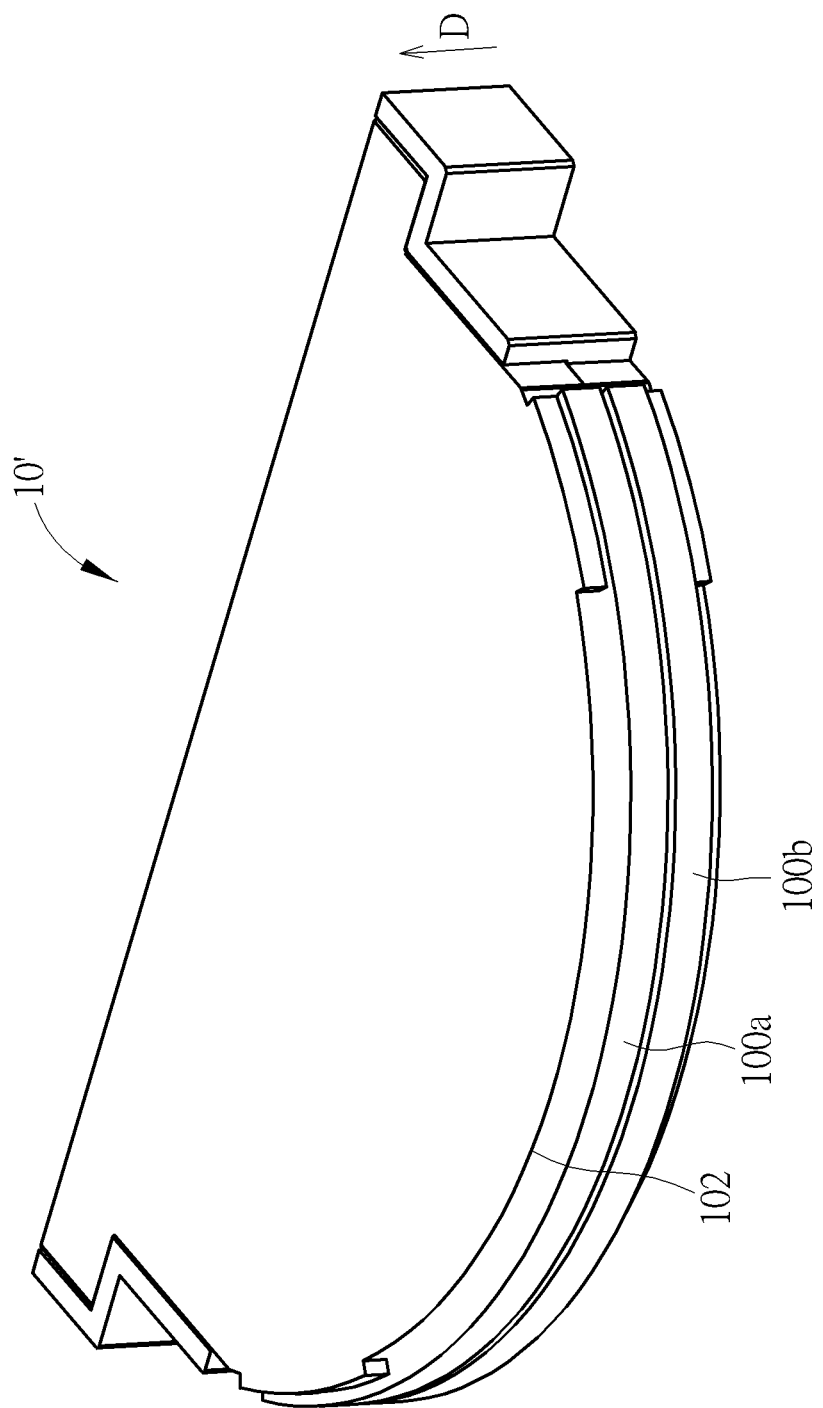
FIG. 7 is a perspective view illustrating a curvilinear ultrasonic transducer according to another embodiment of the invention.

Referring to FIG. 7, FIG. 7 is a perspective view illustrating a curvilinear ultrasonic transducer 10' according to another embodiment of the invention. The main difference between the curvilinear ultrasonic transducer 10' and the aforesaid curvilinear ultrasonic transducer 10 is that the curvilinear ultrasonic transducer 10' comprises a plurality of transducer layers 100a, 100b and the transducer layers 100a, 100b are arranged side by side along a short axis D, as shown in FIG. 7. In this embodiment, the curvilinear ultrasonic transducer 10' may be flat and have a curvilinear front end 102, wherein a plurality of transmitting units may be disposed at the curvilinear front end 102 to form the transducer layers 100a, 100b. In practical applications, the transmitting units may be piezoelectric elements. The transducer layers 100a, 100b may increase the transmitting intensity of the ultrasound, such that the voltage does not need to be increased by circuit design.

Figure 8:
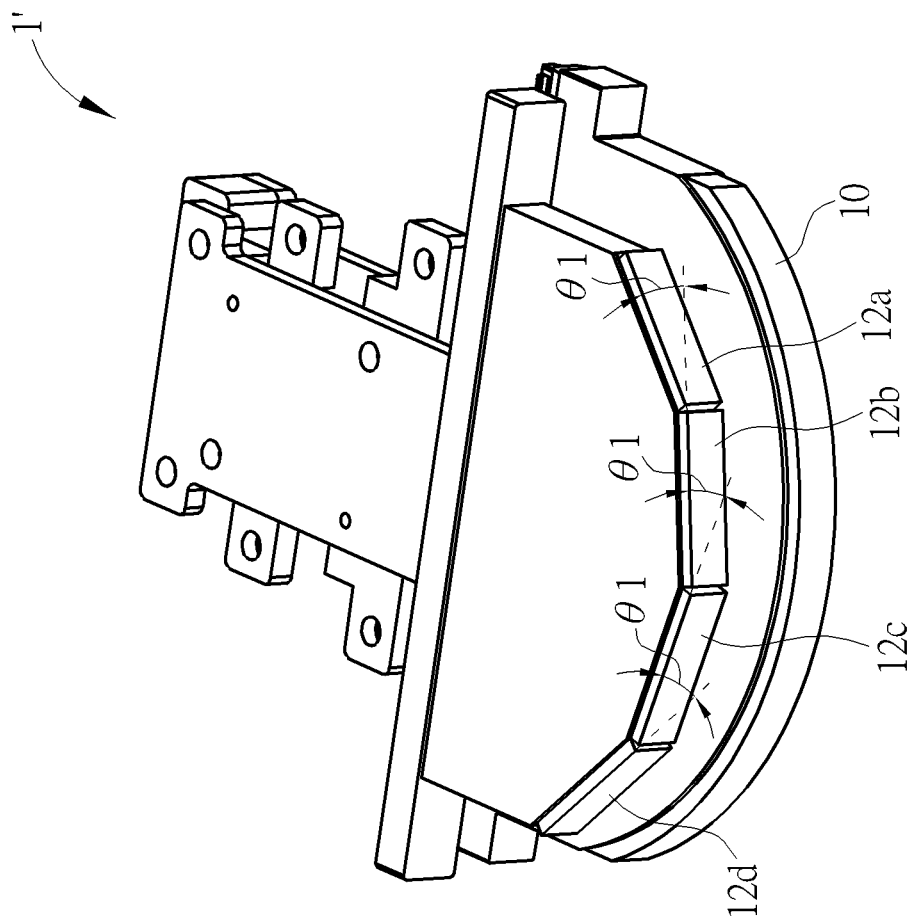
FIG. 8 is a perspective view illustrating an underwater ultrasonic device according to another embodiment of the invention.
Figure 9:
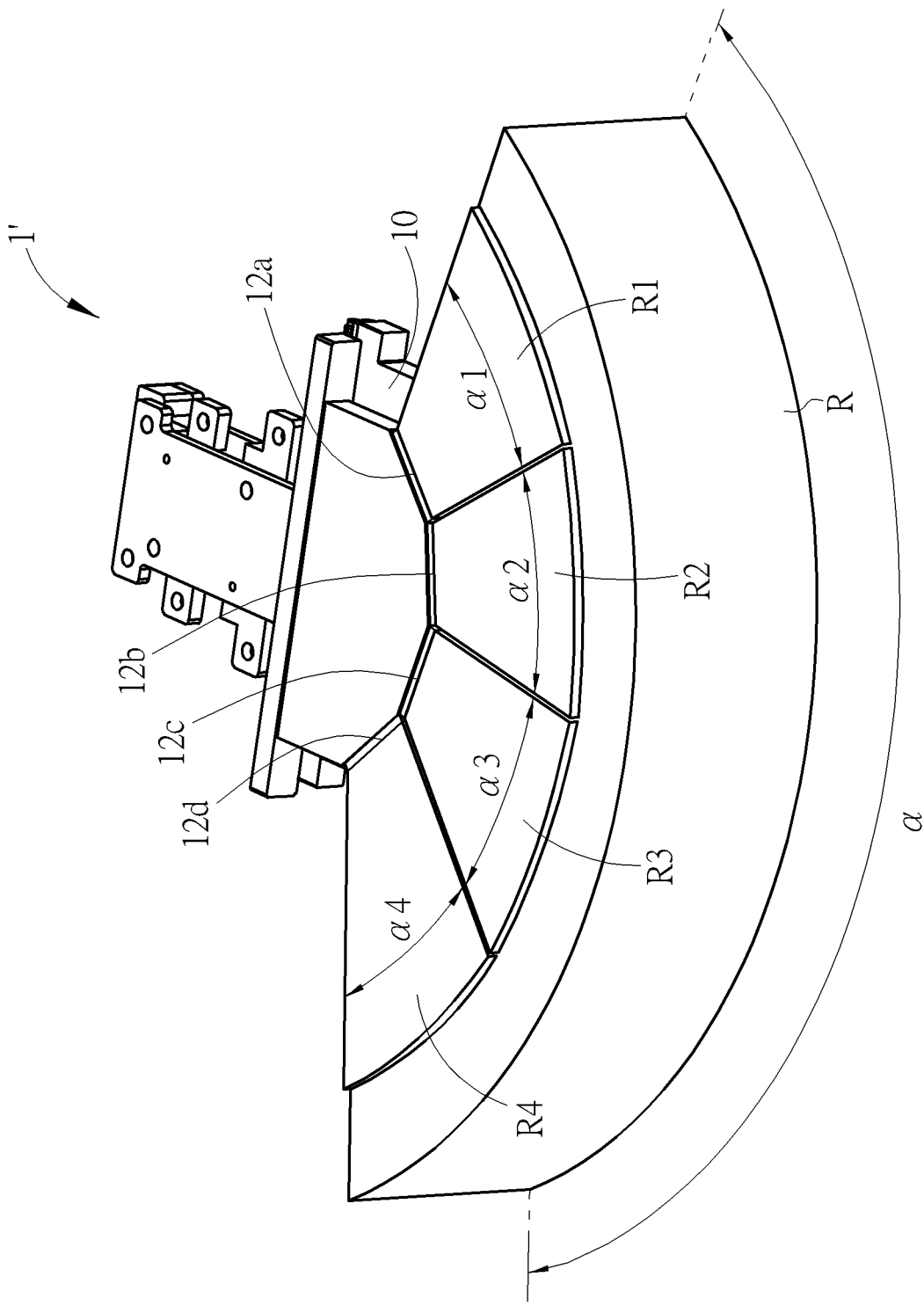
FIG. 9 is a schematic view illustrating the underwater ultrasonic device shown in FIG. 8 forming a wide-angle measuring range.

Referring to FIGS. 8 and 9, FIG. 8 is a perspective view illustrating an underwater ultrasonic device 1' according to another embodiment of the invention and FIG. 9 is a schematic view illustrating the underwater ultrasonic device 1' shown in FIG. 8 forming a wide-angle measuring range. The main difference between the underwater ultrasonic device 1' and the aforesaid underwater ultrasonic device 1 is that the straight linear ultrasonic transducers 12a, 12b, 12c, 12d of the underwater ultrasonic device 1' are arranged end to end at an identical side of the curvilinear ultrasonic transducer 10, as shown in FIGS. 8 and 9. In this embodiment, the first angle θ1 is included between the first straight linear ultrasonic transducer 12a and the second straight linear ultrasonic transducer 12b, the first angle θ1 is included between the second straight linear ultrasonic transducer 12b and the third straight linear ultrasonic transducer 12c, and the first angle θ1 is included between the third straight linear ultrasonic transducer 12c and the fourth straight linear ultrasonic transducer 12d, such that the straight linear ultrasonic transducers 12a, 12b, 12c, 12d are arranged end to end along a curvilinear surface of the curvilinear ultrasonic transducer 10. In this embodiment, each of the ultrasonic coverage angles α1, α2, α3, α4 may be 30 degrees and the first angle θ1 may be 30 degrees, as shown in FIG. 8. Accordingly, the measuring ranges R1, R2, R3, R4 of the straight linear ultrasonic transducers 12a, 12b, 12c, 12d may be arranged in sequence, as shown in FIG. 9, so as to cooperate with the measuring range R of the curvilinear ultrasonic transducer 10 to form a wide-angle measuring range of 120 degrees. When the straight linear ultrasonic transducers 12a, 12b, 12c, 12d are configured to receive a plurality of reflected signals of the ultrasonic signals, the receiving ranges of the straight linear ultrasonic transducers 12a, 12b, 12c, 12d comprise the ranges of the reflected signals of the ultrasonic signals.

Therefore, according to the aforesaid underwater ultrasonic devices 1, 1' of the invention, the straight linear ultrasonic transducers 12a, 12b, 12c, 12d may be stacked with each other at opposite sides of the curvilinear ultrasonic transducer 10 or, alternatively, the straight linear ultrasonic transducers 12a, 12b, 12c, 12d may be arranged end to end at an identical side of the curvilinear ultrasonic transducer 10.

Figure 10:
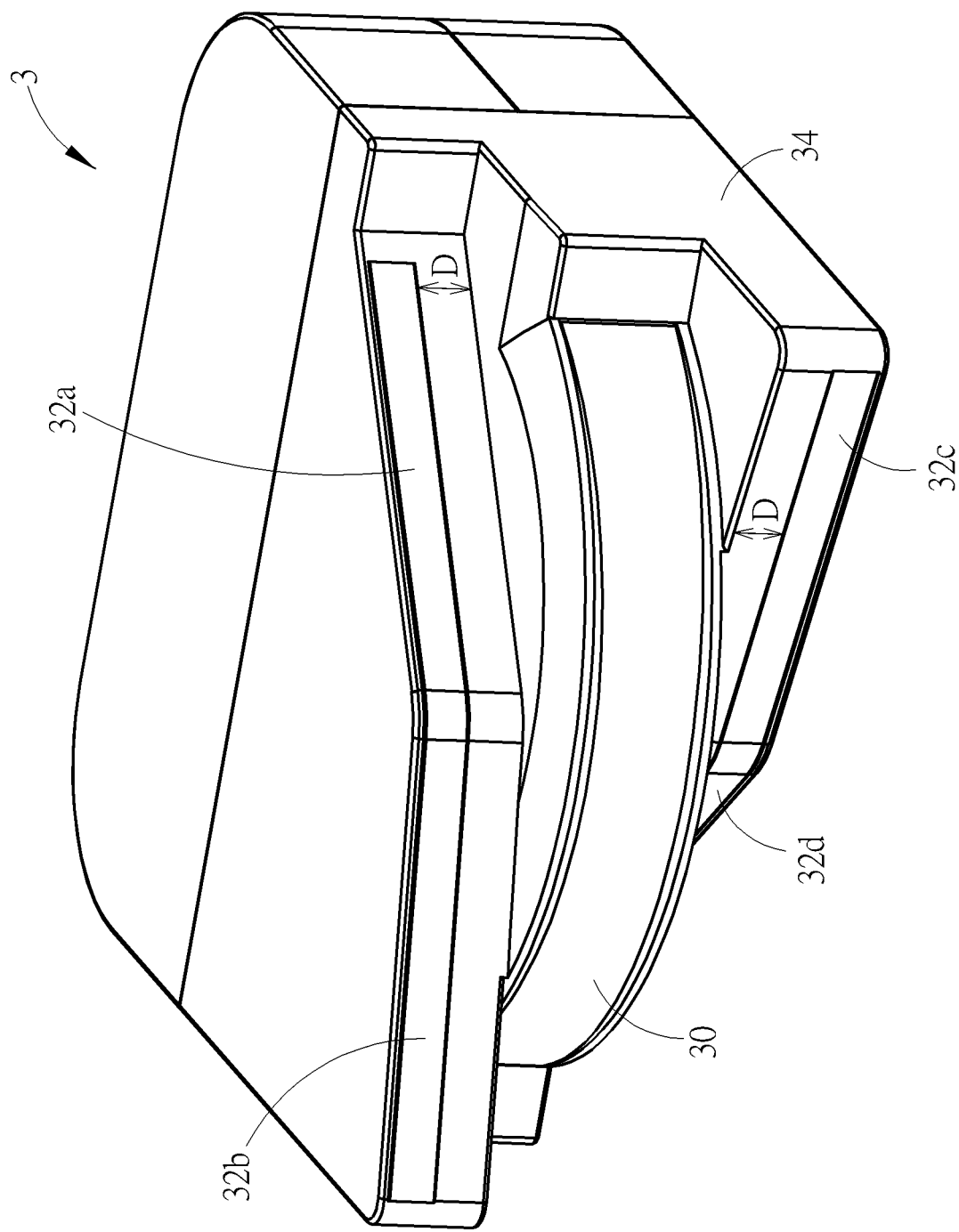
FIG. 10 is a perspective view illustrating an underwater ultrasonic device according to another embodiment of the invention.
Figure 11:
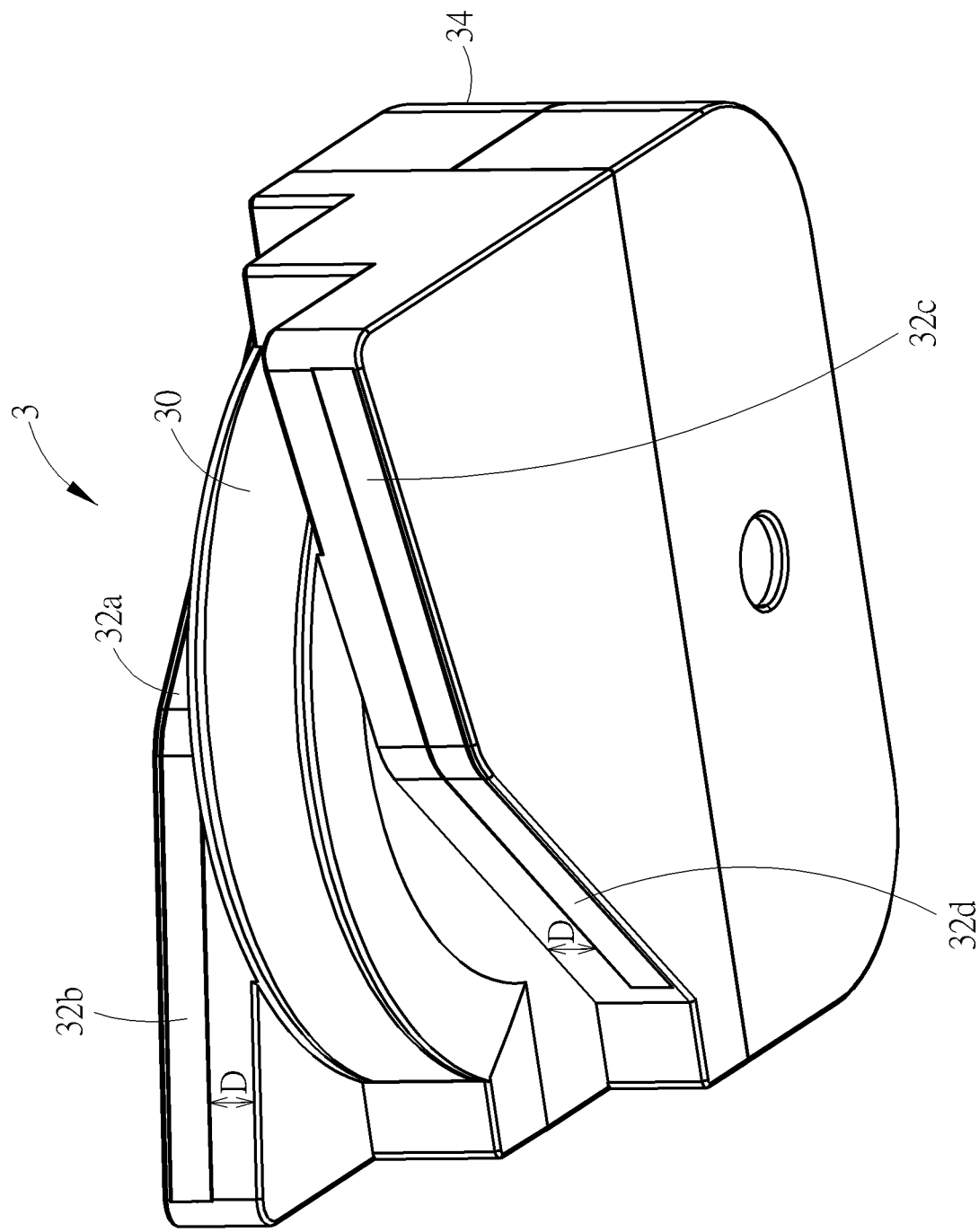
FIG. 11 is a perspective view illustrating the underwater ultrasonic device shown in FIG. 10 from another viewing angle.
Figure 12:
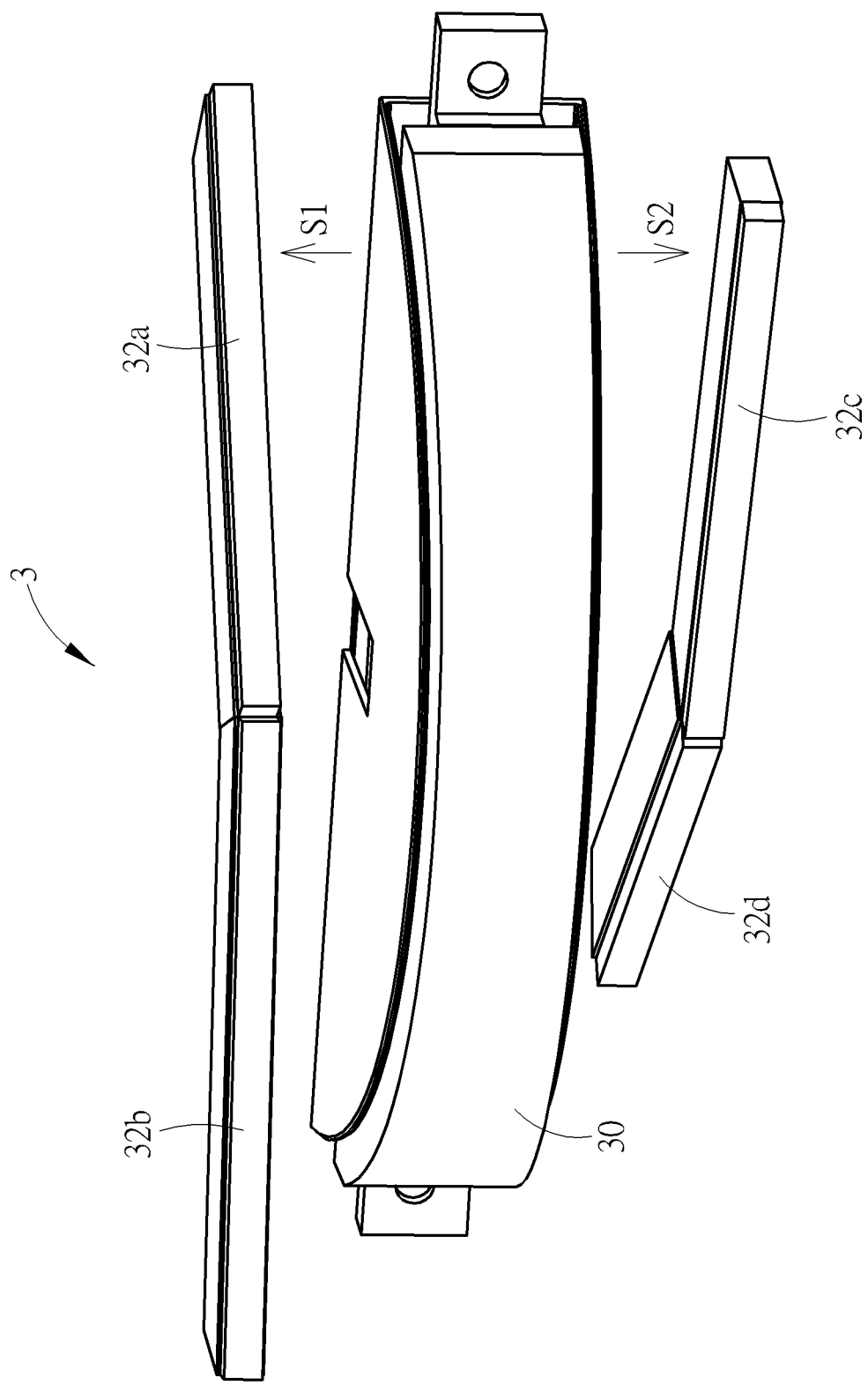
FIG. 12 is a perspective view illustrating the inside of the underwater ultrasonic device shown in FIG. 10.
Figure 13:
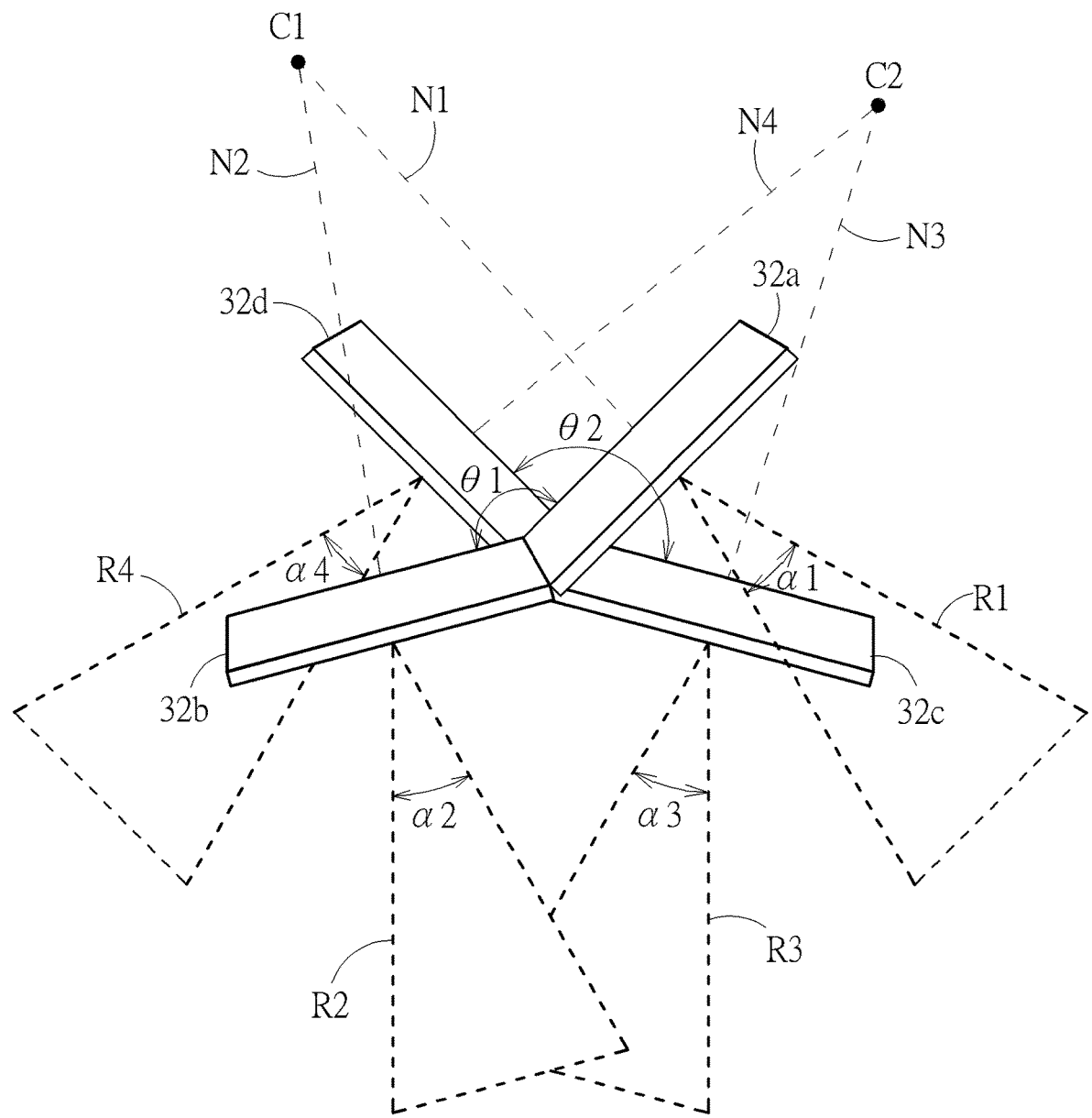
FIG. 13 is a top view illustrating the straight linear ultrasonic transducers shown in FIG. 12.
Figure 14:
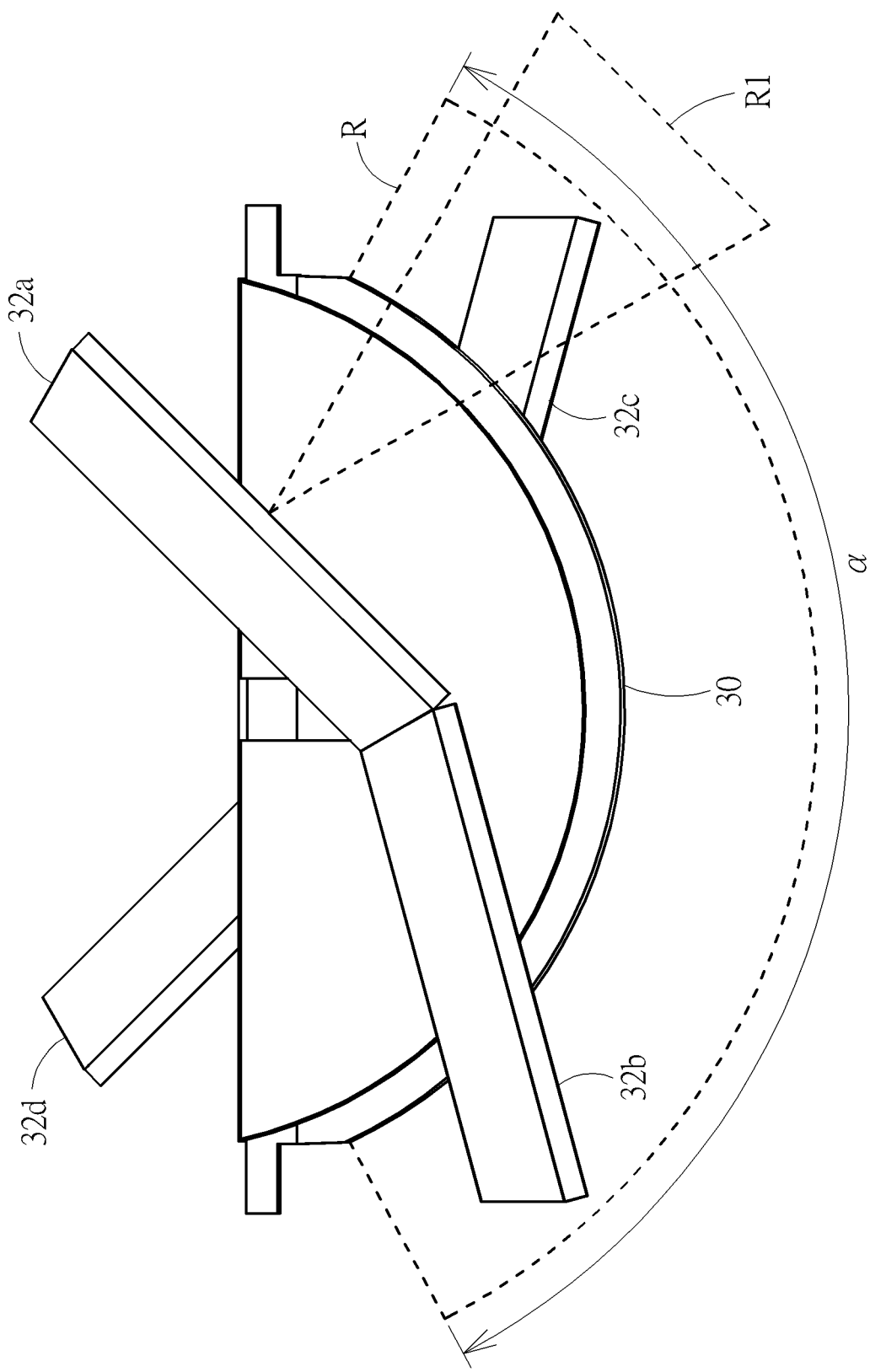
FIG. 14 is a top view illustrating the curvilinear ultrasonic transducer and the straight linear ultrasonic transducers shown in FIG. 12.

Referring to FIGS. 10 to 14, FIG. 10 is a perspective view illustrating an underwater ultrasonic device 3 according to another embodiment of the invention, FIG. 11 is a perspective view illustrating the underwater ultrasonic device 3 shown in FIG. 10 from another viewing angle, FIG. 12 is a perspective view illustrating the inside of the underwater ultrasonic device 3 shown in FIG. 10, FIG. 13 is a top view illustrating the straight linear ultrasonic transducers 32a, 32b, 32c, 32d shown in FIG. 12, and FIG. 14 is a top view illustrating the curvilinear ultrasonic transducer 30 and the straight linear ultrasonic transducers 32a, 32b, 32c, 32d shown in FIG. 12. The underwater ultrasonic device 3 may be disposed below the bottom of a boat or below a rudder and configured to measure underwater objects (e.g. fish or landform). The underwater ultrasonic device 3 may also be used individually for ice fishing.

As shown in FIGS. 10 to 14, the underwater ultrasonic device 3 comprises a curvilinear ultrasonic transducer 30, a first straight linear ultrasonic transducer 32a, a second straight linear ultrasonic transducer 32b, a third straight linear ultrasonic transducer 32c, a fourth straight linear ultrasonic transducer 32d and a casing 34. The curvilinear ultrasonic transducer 30, the first straight linear ultrasonic transducer 32a, the second straight linear ultrasonic transducer 32b, the third straight linear ultrasonic transducer 32c and the fourth straight linear ultrasonic transducer 32d are disposed in the casing 34. It should be noted that a phased array ultrasonic transducer is also a straight linear ultrasonic transducer mentioned in the invention.

As shown in FIG. 12, the second straight linear ultrasonic transducer 32b and the first straight linear ultrasonic transducer 32a are arranged end to end at a first side S1 of the curvilinear ultrasonic transducer 30, and the fourth straight linear ultrasonic transducer 32d and the third straight linear ultrasonic transducer 32c are arranged end to end at a second side S2 of the curvilinear ultrasonic transducer 30, wherein the second side S2 is opposite to the first side S1. In this embodiment, the first straight linear ultrasonic transducer 32a and the second straight linear ultrasonic transducer 32b may be formed in one-piece, and the third straight linear ultrasonic transducer 32c and the fourth straight linear ultrasonic transducer 32d may be formed in one-piece. In another embodiment, the first straight linear ultrasonic transducer 32a and the second straight linear ultrasonic transducer 32b may also be individual bodies, and the third straight linear ultrasonic transducer 32c and the fourth straight linear ultrasonic transducer 32d may also be individual bodies.

In this embodiment, the curvilinear ultrasonic transducer 30 may be configured to transmit a plurality of ultrasonic signals and the first, second, third and fourth straight linear ultrasonic transducers 32a, 32b, 32c, 32d may be configured to receive a plurality of reflected signals of the ultrasonic signals. For further explanation, the curvilinear ultrasonic transducer 30 may be a curvilinear ultrasonic transmitter configured to transmit signals towards a fan-shaped region R, as shown in FIG. 14. At this time, if an object exists in the fan-shaped region R, the signals will be reflected by the object. The first straight linear ultrasonic transducer 32a may be a first straight linear ultrasonic receiver configured to receive reflected signals of a first region R1, the second straight linear ultrasonic transducer 32b may be a second straight linear ultrasonic receiver configured to receive reflected signals of a second region R2, the third straight linear ultrasonic transducer 32c may be a third straight linear ultrasonic receiver configured to receive reflected signals of a third region R3, and the fourth straight linear ultrasonic transducer 32d may be a fourth straight linear ultrasonic receiver configured to receive reflected signals of a fourth region R4, wherein the first, second, third and fourth regions R1, R2, R3, R4 are continuous regions including the fan-shaped region R.

For further explanation, the first straight linear ultrasonic transducer 32a has a first measuring range R1 (i.e. the first region R1), the second straight linear ultrasonic transducer 32b has a second measuring range R2 (i.e. the second region R2), the third straight linear ultrasonic transducer 32c has a third measuring range R3 (i.e. the third region R3), and the fourth straight linear ultrasonic transducer 32d has a fourth measuring range R4 (i.e. the fourth region R4), wherein the second measuring range R2 and the third measuring range R3 are between the first measuring range R1 and the fourth measuring range R4. Furthermore, the curvilinear ultrasonic transducer 30 has a measuring range R (i.e. the fan-shaped region R). When the measuring range R is a transmitting range of the curvilinear ultrasonic transducer 30, the measuring ranges R1, R2, R3, R4 are receiving ranges of the first, second, third and fourth straight linear ultrasonic transducers 32a, 32b, 32c, 32d. Accordingly, the invention may form a wide-angle measuring range by overlapping the transmitting range (i.e. the fan-shaped region R) of the curvilinear ultrasonic transducer 30 and the receiving ranges (i.e. the regions R1, R2, R3, R4) of the straight linear ultrasonic transducers 32a, 32b, 32c, 32d.

As shown in FIG. 13, a first angle $\theta 1$ is included between the first straight linear ultrasonic transducer 32a and the second straight linear ultrasonic transducer 32b, such that the first straight linear ultrasonic transducer 32a and the second straight linear ultrasonic transducer 32b share an axial center C1. At this time, a normal line N1 of the first straight linear ultrasonic transducer 32a and a normal line N2 of the second straight linear ultrasonic transducer 32b intersect at the axial center C1. Furthermore, a second angle $\theta 2$ is included between the third straight linear ultrasonic transducer 32c and the fourth straight linear ultrasonic transducer 32d, such that the third straight linear ultrasonic transducer 32c and the fourth straight linear ultrasonic transducer 32d share another axial center C2. At this time, a normal line N3 of the third straight linear ultrasonic transducer 32c and a normal line N4 of the fourth straight linear ultrasonic transducer 32d intersect at the axial center C2. In this embodiment, the first angle $\theta 1$ and the second angle $\theta 2$ may be larger than or equal to 30 degrees and smaller than 180 degrees, such that the measuring ranges R1, R2, R3, R4 of the straight linear ultrasonic transducers 32a, 32b, 32c, 32d may cooperate with the measuring range R of the curvilinear ultrasonic transducer 30 to form a wide-angle measuring range.

As shown in FIGS. 13 and 14, the measuring range R of the curvilinear ultrasonic transducer 30 has an ultrasonic coverage angle $\alpha$, the first measuring range R1 of the first straight linear ultrasonic transducer 32a has an ultrasonic coverage angle $\alpha 1$, the second measuring range R2 of the second straight linear ultrasonic transducer 32b has an ultrasonic coverage angle $\alpha 2$, the third measuring range R3 of the third straight linear ultrasonic transducer 32c has an ultrasonic coverage angle $\alpha 3$, and the fourth measuring range R4 of the fourth straight linear ultrasonic transducer 32d has an ultrasonic coverage angle $\alpha 4$. For example, the ultrasonic coverage angle $\alpha$ of the curvilinear ultrasonic transducer 30 may be 120 degrees and each of the ultrasonic coverage angles $\alpha 1$, $\alpha 2$, $\alpha 3$, $\alpha 4$ of the straight linear ultrasonic transducers 32a, 32b, 32c, 32d may be 30 degrees. At this time, the invention may form a wide-angle measuring range of 120 degrees by overlapping the measuring range R of the curvilinear ultrasonic transducer 30 and the measuring ranges R1, R2, R3, R4 of the straight linear ultrasonic transducers 32a, 32b, 32c, 32d.

As shown in FIGS. 10 and 11, the first straight linear ultrasonic transducer 32a and the second straight linear ultrasonic transducer 32b are apart from the first side S1 of the curvilinear ultrasonic transducer 30 by a predetermined distance D, and the third straight linear ultrasonic transducer 32c and the fourth straight linear ultrasonic transducer 32d are apart from the second side S2 of the curvilinear ultrasonic transducer 30 by the predetermined distance D. Accordingly, the invention can prevent the measuring ranges R1, R2, R3, R4 of the straight linear ultrasonic transducers 32a, 32b, 32c, 32d from interfering with the curvilinear ultrasonic transducer 30. It should be noted that the predetermined distance D may be determined according to practical applications as long as the measuring ranges R1, R2, R3, R4 of the straight linear ultrasonic transducers 32a, 32b, 32c, 32d does not interfere with the curvilinear ultrasonic transducer 30.

In general, the longer the length of the straight linear ultrasonic transducer is, the better the resolution of the image is. Thus, the invention may selectively adjust the length of at least one of the straight linear ultrasonic transducers 32a, 32b, 32c, 32d according to different embodiments below, so as to improve the resolution of the corresponding portion in the image.

In an embodiment, when a boat is chasing fishes, the underwater ultrasonic device 3 may be used to detect living bodies (e.g. fishes) close to the water level. At this time, the first straight linear ultrasonic transducer 32a of the underwater ultrasonic device 3 may be disposed close to the water level (i.e. the measuring range R1 close to the water level) and the length of the first straight linear ultrasonic transducer 32a may be larger than the length of the second straight linear ultrasonic transducer 32b. In another embodiment, the fourth straight linear ultrasonic transducer 32d of the underwater ultrasonic device 3 may be disposed close to the water level (i.e. the measuring range R4 close to the water level) and the length of the fourth straight linear ultrasonic transducer 32d may be larger than the length of the third straight linear ultrasonic transducer 32c. In this embodiment, the underwater ultrasonic device 3 may be equipped with a rotatable structure. The underwater ultrasonic device 3 is oriented downward to detect underwater image in a general state. When chasing fishes, the underwater ultrasonic device 3 is rotated towards the water level to make the first straight linear ultrasonic transducer 32a or the fourth straight linear ultrasonic transducer 32d closer to the water level. Accordingly, the invention can improve the resolution of the corresponding portion in the image close to the water level.

In another embodiment, the underwater ultrasonic device 3 may be used to detect living bodies (e.g. fishes) towards the seabed. At this time, the length of the second straight linear ultrasonic transducer 32b may be larger than the length of the first straight linear ultrasonic transducer 32a and the length of the third straight linear ultrasonic transducer 32c may be larger than the length of the fourth straight linear ultrasonic transducer 32d. For further explanation, since the measuring ranges R2, R3 of the straight linear ultrasonic transducers 32b, 32c are between the measuring ranges R1, R4 of the straight linear ultrasonic transducers 32a, 32d, the invention may increase the lengths of the straight linear ultrasonic transducers 32b, 32c to improve the resolution of the middle portion in the image.

In another embodiment, when the fourth measuring range R4 of the fourth straight linear ultrasonic transducer 32d is not important, the lengths of the first, second and third straight linear ultrasonic transducers 32a, 32b, 32c may be identical and larger than the length of the fourth straight linear ultrasonic transducer 32d. In other words, when the fourth measuring range R4 of the fourth straight linear ultrasonic transducer 32d is not important, the invention may increase the lengths of the first, second and third straight linear ultrasonic transducers 32a, 32b, 32c to improve the resolution of the corresponding portion in the image. Accordingly, when at least one of the measuring ranges R1, R2, R3, R4 of the straight linear ultrasonic transducers 32a, 32b, 32c, 32d is not important, the invention may adjust the lengths of the straight linear ultrasonic transducers 32a, 32b, 32c, 32d according to the aforesaid manner, so as to improve the resolution of the corresponding portion in the image.

Figure 15:
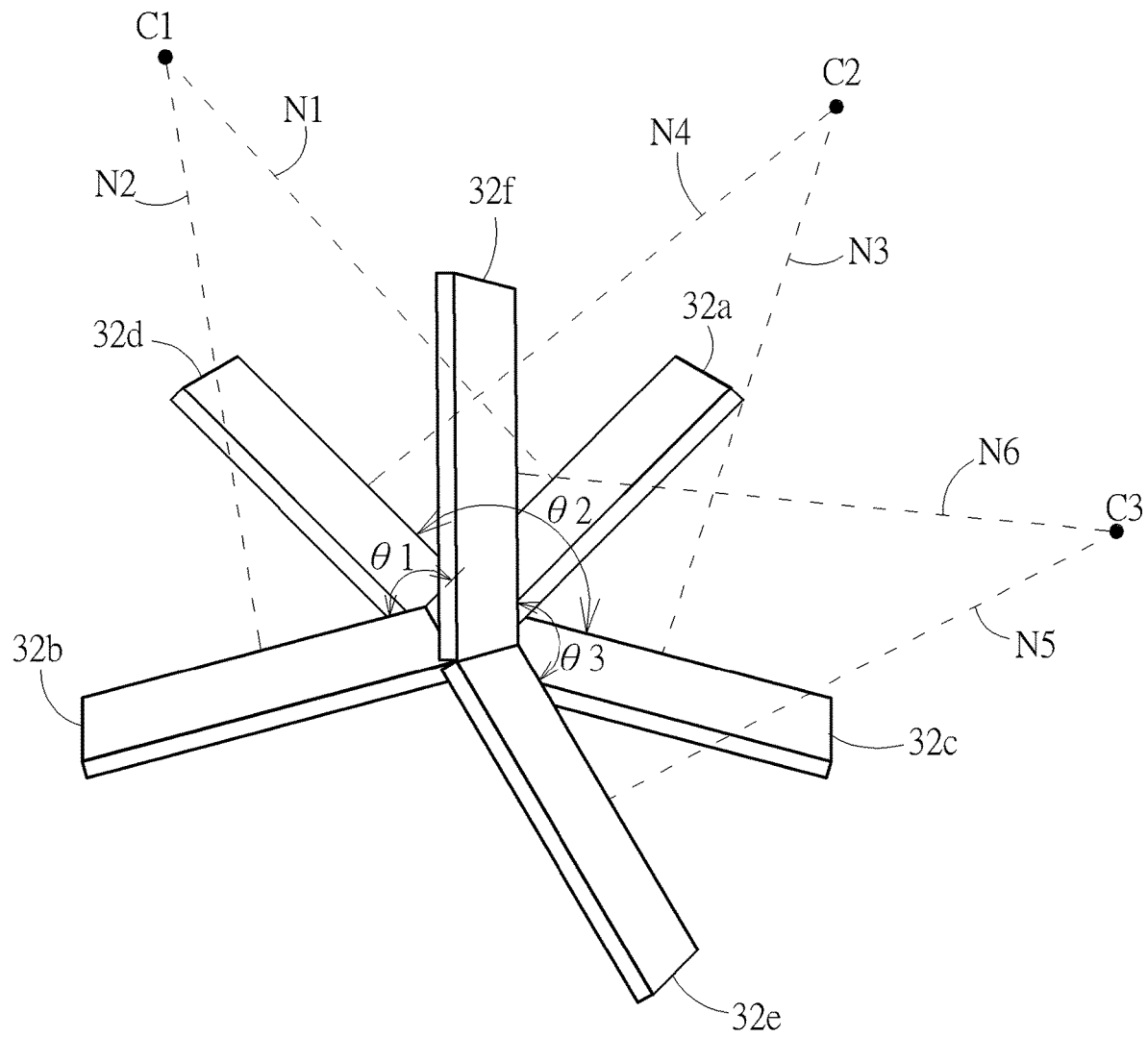
FIG. 15 is a top view illustrating a plurality of straight linear ultrasonic transducers according to another embodiment of the invention.

Referring to FIG. 15, FIG. 15 is a top view illustrating a plurality of straight linear ultrasonic transducers 32a, 32b, 32c, 32d, 32e, 32f according to another embodiment of the invention. As shown in FIG. 15, in addition to the aforesaid straight linear ultrasonic transducers 32a, 32b, 32c, 32d, the invention may further add a fifth straight linear ultrasonic transducer 32e and a sixth straight linear ultrasonic transducer 32f, wherein the fifth straight linear ultrasonic transducer 32e and the sixth straight linear ultrasonic transducer 32f may be arranged end to end at the first side S1 or the second side S2 of the aforesaid curvilinear ultrasonic transducer 30. Furthermore, a third angle θ3 is included between the fifth straight linear ultrasonic transducer 32e and the sixth straight linear ultrasonic transducer 32f, such that the fifth straight linear ultrasonic transducer 32e and the sixth straight linear ultrasonic transducer 32f share an axial center C3. At this time, a normal line N5 of the fifth straight linear ultrasonic transducer 32e and a normal line N6 of the sixth straight linear ultrasonic transducer 32f intersect at the axial center C3. In this embodiment, the third angle θ3 may also be larger than or equal to 30 degrees and smaller than 180 degrees. The measuring ranges of the straight linear ultrasonic transducers 32a, 32b, 32c, 32d, 32e, 32f may also cooperate with the measuring range of the aforesaid curvilinear ultrasonic transducer 30 to form a wide-angle measuring range. Therefore, the invention may increase or decrease the number of straight linear ultrasonic transducers to adjust the required wide-angle measuring range.

As mentioned in the above, the invention may forma wide-angle measuring range by overlapping a measuring range (e.g. transmitting range or receiving range) of an ultrasonic transducer (e.g. curvilinear ultrasonic transducer) and a measuring range (e.g. transmitting range or receiving range) of the straight linear ultrasonic transducers. Furthermore, if a target is moving, the invention may change a displacement between the ultrasonic transducers to change the measuring range along with the movement of the target, so as to track the target.

In an embodiment, two straight linear ultrasonic transducers located at an identical side of the curvilinear ultrasonic transducer are arranged end to end and have an angle included therebetween, such that the two straight linear ultrasonic transducers share an axial center. Accordingly, the invention can reduce the whole thickness of the underwater ultrasonic device effectively. Still further, the straight linear ultrasonic transducer may be apart from the curvilinear ultrasonic transducer by a predetermined distance, so as to prevent the measuring range of the straight linear ultrasonic transducer from interfering with the curvilinear ultrasonic transducer. Moreover, the invention may adjust the length of the straight linear ultrasonic transducer according to different applications, so as to improve the resolution of the corresponding portion in the image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An underwater ultrasonic device comprising:
   a curvilinear ultrasonic transducer; and
   a plurality of straight linear ultrasonic transducers comprising a first straight linear ultrasonic transducer and a second straight linear ultrasonic transducer, the curvilinear ultrasonic transducer, the first straight linear ultrasonic transducer and the second straight linear ultrasonic transducer being plate-shaped, the second straight linear ultrasonic transducer being stacked with the first straight linear ultrasonic transducer at a first flat side surface of the curvilinear ultrasonic transducer, an projection of an intersection between the first straight linear ultrasonic transducer and the second straight linear ultrasonic transducer onto a plane where the first flat side surface of the curvilinear ultrasonic transducer is located being within an area of the first flat side surface of the curvilinear ultrasonic transducer, a first angle being included between the first straight linear ultrasonic transducer and the second straight linear ultrasonic transducer, one of the curvilinear ultrasonic transducer, the first straight linear ultrasonic transducer and the second straight linear ultrasonic transducer being configured to transmit a plurality of ultrasonic signals, another one of the curvilinear ultrasonic transducer, the first straight linear ultrasonic transducer and the second straight linear ultrasonic transducer being configured to receive a plurality of reflected signals of the ultrasonic signals.

2. The underwater ultrasonic device of claim 1, wherein one of the first straight linear ultrasonic transducer and the second straight linear ultrasonic transducer has an ultrasonic coverage angle and a multiple relationship exists between the first angle and the ultrasonic coverage angle.

3. The underwater ultrasonic device of claim 1, wherein the straight linear ultrasonic transducers further comprise:
   a third straight linear ultrasonic transducer; and
   a fourth straight linear ultrasonic transducer stacked with the third straight linear ultrasonic transducer at a second flat side surface of the curvilinear ultrasonic transducer, the second flat side surface being opposite to the first flat side surface.

4. The underwater ultrasonic device of claim 3, wherein the first angle is included between the third straight linear ultrasonic transducer and the fourth straight linear ultrasonic transducer.

5. The underwater ultrasonic device of claim 3, wherein a second angle is included between the first straight linear ultrasonic transducer and the third straight linear ultrasonic transducer, and a multiple relationship exists between the first angle and the second angle.

6. The underwater ultrasonic device of claim 3, wherein the second straight linear ultrasonic transducer is stacked with the first straight linear ultrasonic transducer to form an X-shape and the fourth straight linear ultrasonic transducer is stacked with the third straight linear ultrasonic transducer to form an X-shape.

* * * * *